United States Patent [19]

Barnich

[11] 4,249,240
[45] Feb. 3, 1981

[54] ADDRESS SYSTEM FOR BUS INTERCONNECTED COMPUTER SYSTEM

[75] Inventor: Richard G. Barnich, Saline, Mich.
[73] Assignee: Xycom, Inc., Saline, Mich.
[21] Appl. No.: 16,758
[22] Filed: Mar. 2, 1979
[51] Int. Cl.³ .......................... G06F 7/04; G06F 13/00
[52] U.S. Cl. .................................................... 364/200
[58] Field of Search ... 364/200 MS File, 900 MS File
[56] References Cited

U.S. PATENT DOCUMENTS

| | | | |
|---|---|---|---|
| 3,919,693 | 11/1975 | Anderson | 364/200 |
| 4,001,790 | 1/1977 | Barlow | 364/200 |
| 4,024,505 | 5/1977 | Sperling | 364/200 |

*Primary Examiner*—Harvey E. Springborn
*Attorney, Agent, or Firm*—Krass & Young

[57] ABSTRACT

A computer system employs a CPU interconnected to a number of devices and terminals over a common bus. Each device has a different address assigned to it and a message from one device to another, over the bus, is prefixed with the receiving device's address. To simplify the hardware of input/output devices connected to the system all such devices have an abbreviated address and a prefix common to the class. A decoder detects when this prefix is transmitted on the address bus and sends a signal over a line that connects only to these devices. When the devices receive a signal on this line they examine the abbreviated portion of the address and are activated when coincidence is detected.

3 Claims, 3 Drawing Figures

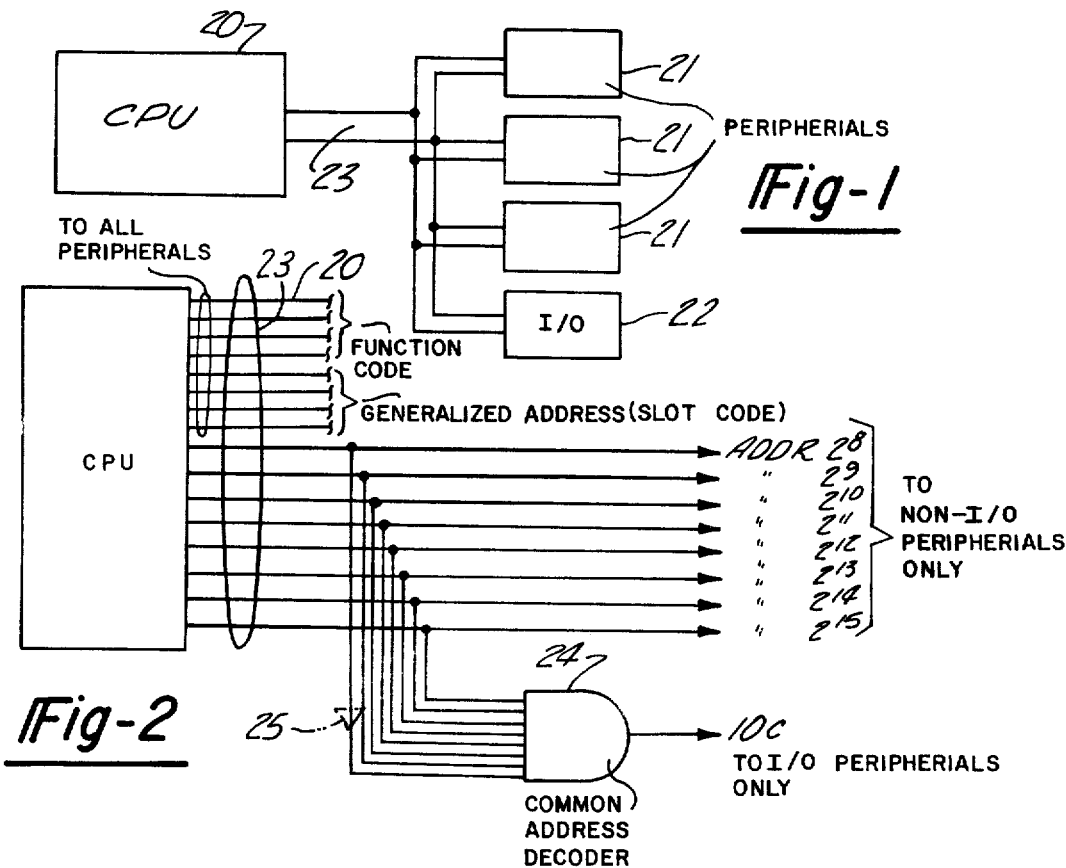
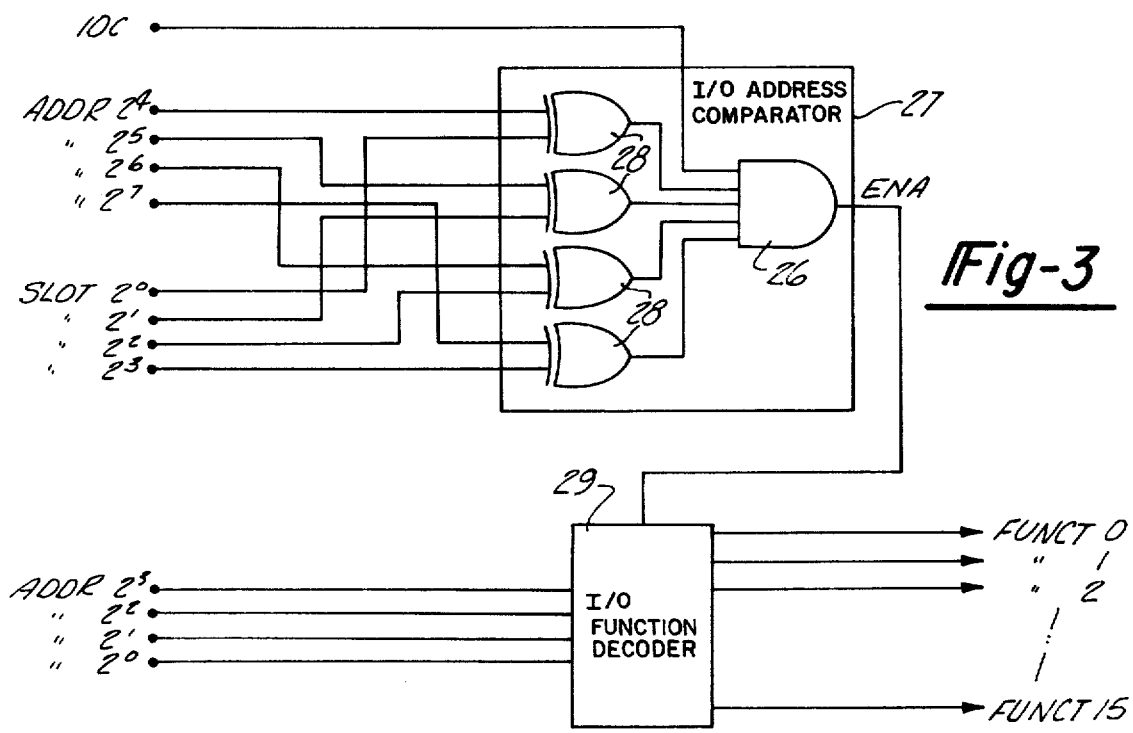

ADDRESS SYSTEM FOR BUS INTERCONNECTED COMPUTER SYSTEM

This is a continuation, of application Ser. No. 821,986, filed Aug. 5, 1977 now abondoned.

BACKGROUND OF THE INVENTION

This invention relates to digital computer systems employing peripherals connected to a central processing unit via a common bus and more particularly to logic circuitry which allows the use of simplified address recognition structure by the peripherals.

PRIOR ART

Bus type channels are often used to connect a plurality of devices such as memory, keyboards, printers, processing terminals and the like to a digital computer. Each device connected to the bus receives all of the information sent out by the central computer but responds to only those signals whih are prefixed with the device's unique address as transmitted on an address line section of the bus. Whenever a signal, prefixed with an address, is transmitted, each peripheral device reads the entire address code to determine which device is intended to receive the information which will follow. Each device necessarily has circuitry to receive and decode the incoming address and compare it to its own permanent unique address source. Because each peripheral device must read the entire address of each incoming signal, a significant amount of hard wired circuitry in each device is necessitated.

It is one of the principal objects of the present invention to provide a computer system wherein the decoding logic for certain devices is simplified, thereby reducing the decoding and address recognizing circuitry.

SUMMARY OF THE INVENTION

The present invention relates to a unique addressing scheme applied to a system having a plurality of digital devices. Each device has a unique and permanent address encoded within. The basic addresses for the devices include a particular number (m) of bits, but to simplify the address recognition hardware for certain devices, they have abbreviated addresses consisting of a lesser number (m−n) bits. These devices with the abbreviated address are interconnected with the CPU by an auxilliary line forming part of the address bus. When any of the devices in the system, including the CPU, address these devices with abbreviated addresses, they use a full length (m bit) address. A particular number (n) of bits of this address signify that one of the devices with an abbreviated address is being called. The CPU contains circuitry for recognizing this common n bit prefix and sending out a code on an auxilliary line of the bus which connects to all of the devices with the abbreviated address. The address recognition circuitry within the abbreviated address devices examines the condition of the auxilliary bus line as well as the abbreviated number of bus lines that are connected to that device.

Systems formed in accordance with the present invention use abbreviated addresses for a certain class of peripherals within the system. This is accomplished by assigning an n bit code that is common to each device within this class. When that code is transmitted on the address bus, a decoder connected to the bus detects it and signals each member of the class to read the remaining m−n bits on the address bus and determine if it is their code by comparing the next m−n bits with their internal address source code. If the two are identical, a comparator generates an enabling signal within the intended device. With this system, the devices within the designated class need only to be able to read and generate internally a m−n bit address code rather than a m bit code, thereby reducing the amount of address recognizing circuitry as well as address bus line requirements.

In the preferred embodiment of the invention, which will subsequently be described in detail, the computer system comprises a central processing unit (CPU), a plurality of periperals including at least one I/O device and a bus which interconnects all of the peripherals and the CPU allowing communication between any two of the units within the system. The system employs 16-bit words for communication between devices on the bus. Each device has a unique address assigned to it. Of the 16 bits of a word, the first 12 most significant bits constitute the address of a device and the next 4 most significant bits constitute the function code. The first 8 most significant bits in the address of all the I/O devices are common, leaving the next 4 most significant bits, or slot code, to differentiate the I/O devices. Accordingly, this arrangement will accommadate up to 16 I/O devices ($2^4$). There is a line within the bus for each of the 16 bits emanating from the CPU. Of these, the first 8, corresponding to the first 8 most significant bits in the address code, interconnect to only the non-I/O peripherals. Additionally, there are 8 more lines within the address bus corresponding to the next 8 most significant bits (slot code and function code) which interconnect with all of the peripherals. A decoder reads the first 8 lines of the bus and triggers an I/O compare signal when the common 8 bit code assigned to all the I/O devices appears on the bus. A seventeenth line in the bus which connects to only the I/O devices transmits the I/O compare signal to the I/O card associated with each I/O device. The I/O card associated with each I/O device contains a 4-bit comparator circuit which reads lines 9 through 12 of the bus which carry the, 5th through (8th most significant bits of a word. Upon the receipt of an I/O compare signal each I/O device compares the inputs of the fifth through eighth lines on the bus with the unique 4-bit slot code which is hard wired on the backplane of the particular I/O device to generate an enable signal upon coincidence. The enable signal activates a function decoder within the I/O device which reads the 4-bit function code, triggering the desired response from the device. Accordingly, the I/O devices within the system need only read the slot code, function code and the I/O compare signal rather than the entire 16 bit word, realizing a commensurate saving in logic hardware and address bus lines.

Other objectives, advantages and applications of the present invention will be made apparent by the following detailed description of a preferred embodiment of the invention. The description makes reference to the accompanying drawings in which:

FIG. 1 is a schematic diagram of a computer peripheral system embodying the present invention;

FIG. 2 is a schematic view of the portion of the CPU relevant to I/O compare signal generation;

FIG. 3 is a schematic diagram of the relevant portion of the I/O card, card enable signal generator and function decoder in each I/O device.

Referring to FIG. 1, the present invention is preferably employed in a digital computer system having at least one CPU 20 which may receive binary information from and transmit binary information to a plurality of peripheral devices 21 including at least one I/O device 22. Four peripherals are illustrated, including the one I/O device 22. However, a larger number (up to $2^{16}$) of peripherals 21 including up to sixteen I/O devices 22 may be employed. Additionally, more than one processing unit 20 may be used by simply interconnecting additional processors to the bus. A bus 23 electrically interconnects all of the peripherals 21 and the CPU 20 allowing communication between any two of the units within the system.

Referring to FIG. 2, there is a line within the bus 23 corresponding with each bit in a 16-bit word. These sixteen lines are labeled ADDR $2^0$ through $2^{15}$ inclusively and are associated with the sixteen bits making up the 16 bit word. Each of the eight lines (labeled ADDR $2^8$ through $2^{15}$) associated with the first eight most significant bits of the $2^8$–$2^{15}$ word are electrically connected to an input of an eight input AND gate 24 as well as to each non-I/O peripheral within the system via the address bus 23. Inverters 25 are selectively placed in series with each input of the AND gate 24 as necessary if the first eight bits of the common portion of the I/O devices address is other than all ones. The output of the AND gate 24 is electrically connected to an auxiliary line (labeled IOC) in the address bus 23 upon which is transmitted an I/O compare signal generated by the AND gate 24 when all of the inputs are ones. The auxiliary line IOC in the address bus 23 feeds each of the I/O devices 22. Additionally, although not illustrated for simplicity, the outputs of CPU 20 to lines ADDR $2^4$ through $2^7$, corresponding with the slot code, and outputs to lines ADDR $2^0$ through $2^3$, corresponding with the function code, are electrically connected to all of the peripherals 21 via the address by 23. The first 8 most significant bits in the address of each I/O device 22 are the same, leaving the next 4 most significant bits, those transmitted on lines ADDR $2^4$ through $2^7$, to differentiate the I/O devices. Accordingly, this assignment will accommadate up to 16 (or $2^4$) I/O devices 22.

Referring to FIG. 3, the I/O compare line IOC is fed into one of the inputs of a NAND gate 26 on an I/O card 27 within each I/O device 22. Lines corresponding to the slot code ADDR $2^4$ through $2^7$ are fed into one of the inputs of one of four EXCLUSIVE OR gates 28 on the I/O card 27. A unique, permanent four bit slot code printed on the backplane of each peripheral is fed into the second input of the four EXCLUSIVE OR gates 28 on the I/O card 27 via lines slot $2^0$ through $2^3$. The outputs of the four EXCLUSIVE OR gates 28 are fed into the remaining four inputs of the five input NAND gate 26 on the I/O card 27. The four EXCLUSIVE OR gates 28 and the NAND gate 26 comprise the comparator logic circuitry whereby the comparison is made by feeding the 5th through 8th most significant bits of the code being transmitted on the bus and the 4-bit slot code in the individual I/O device 22 into the NAND gate 26.

In presence of an I/O compare signal, the output of the NAND gate 26 generates a card enable signal which activates a 4 line to 16 line decoder 29 associated with the individual I/O device 22. This decoder's inputs are connected to the lines in the bus that carry the 1st through 4th bits (function code). In the presence of an enable signal, the decoder 29 within the individual I/O device 22 will perform one of its 16 or ($2^4$) possible functions. If the I/O compare signal is not present or if there is a disparity between any one of the signals on lines ADDR $2^4$ through $2^7$ and their respective slot code feed lines SLOT $2^0$ through $2^3$ the NAND gate 26 will not generate an enable signal. The output of the NAND gate 26 is electrically connected to the four to sixteen line decoder 29 and transmits an enable signal on the enable line ENA upon indentity of a code transmitted on lines ADDR $2^4$ through $2^7$ and the slot code formed on backplane slot code feed lines SLOT $2^0$ through $2^3$ in the presence of an I/O compare signal transmitted upon the auxiliary line IOC of the address bus 23. When an enable signal is present, that four to sixteen line decoder 29 reads the function code transmitted on the lines ADDR $2^0$ through $2^3$ of the address bus 23 which are electrically connected to the inputs of the decoder 29. Thus, upon receiving the appropriate signal, one of the decoder's sixteen outputs (labeled FUNT 0-15) is activated, performing the desired activity. In the absence of an enable signal the decoder 29 will not read the signals on lines ADDR 0-3.

The above described system allows the use of an abbreviated address code for a certain class (I/O devices) of peripherals. Although all peripherals have a unique address, the first eight bits of the address of the I/O devices is the same. That common 8 bit code is read by the AND gate 24 which sends an I/O compare signal to the I/O devices which read the next eight bits containing the slot code and the function code. Non-I/O devices do not read the I/O compare signal, but rather read the entire sixteen bit address as transmitted by the CPU. The I/O devices must read only the eight bits of the slot and function codes and the I/O compare signal realizing a substantial reduction in logic circuitry requirements.

Having thus described my invention, I claim:

1. A computer system comprising:
   a plurality of digital devices;
   a permanent address source forming part of each device, certain of the devices having an address consisting of m digits and other devices having an address consisting of m−n digits;
   an address bus including m−n lines interconnecting all of the devices and an additional n lines interconnecting those devices having m digit addresses;
   comparator means forming part of each device which is operative to receive digital messages from the address bus lines to which the device is interconnected and an output from the device address source for generating an output signal upon identity between the two;
   a decoder connected to said additional n address lines which is operative to generate a particular signal upon the occurrence of a particular signal pattern on those lines to which it is connected;
   an interconnection between said decoder and each of the devices having addresses containing m−n digits operative to carry the output of said decoder;
   and logic means forming part of each of the devices having addresses containing m−n digits for generating an enable signal upon the occurrence of said particular signal from the decoder and an identity output signal from the comparator.

2. The system of claim 1 including one central processing unit connected to the address bus.

3. The system of claim 1, wherein:
   said decoder comprises logic gate means having a plurality of inputs connected to said additional n address lines and having an output upon which said particular signal is delivered, said system futher including a function decoder forming a part of each of the devices having addresses containing m−n digits and having a control input connected with said logic means for receiving said enable signal, said function decoder including a plurality of inputs repectively connected with at least certain ones of said m−n lines and having a plurality of outputs connected with the respectively associated device having an address containing m−n digits.

* * * * *